(12) United States Patent
Astrom et al.

(10) Patent No.: US 10,206,174 B2
(45) Date of Patent: Feb. 12, 2019

(54) DELAYED DEVICE ACTIVATION

(71) Applicant: Telefonaktiebolaget LM Ericsson (publ), Stockholm (SE)

(72) Inventors: Magnus Astrom, Lund (SE); Bengt Lindoff, Bjarred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 242 days.

(21) Appl. No.: 15/109,636

(22) PCT Filed: May 27, 2016

(86) PCT No.: PCT/EP2016/062035
§ 371 (c)(1),
(2) Date: Jul. 3, 2016

(87) PCT Pub. No.: WO2017/202473
PCT Pub. Date: Nov. 30, 2017

(65) Prior Publication Data
US 2018/0146429 A1    May 24, 2018

(51) Int. Cl.
*H04W 52/02* (2009.01)
*H04W 8/00* (2009.01)
*H04W 84/18* (2009.01)

(52) U.S. Cl.
CPC ....... *H04W 52/0251* (2013.01); *H04W 8/005* (2013.01); *H04W 52/028* (2013.01); *H04W 84/18* (2013.01); *Y02D 70/00* (2018.01)

(58) Field of Classification Search
CPC .......... H04W 52/0251; H04W 52/028; H04W 8/005; H04W 84/18; Y02D 70/00
See application file for complete search history.

(56) References Cited

U.S. PATENT DOCUMENTS 9,769,755 B2 *   9/2017   Uchiyama ................ H04Q 9/00
2004/0141380 A1 * 7/2004   Kim ...................... G11C 7/1045
                                                      365/189.05
(Continued)

FOREIGN PATENT DOCUMENTS

WO         2012109647 A1    8/2012

OTHER PUBLICATIONS

ITU-T Y.2060 (Jun. 2012), Series Y: Global Information Infrastructure, Internet Protocol Aspects and Next-Generation Networks, Overview of the Internet of things, 22 pages.
(Continued)

*Primary Examiner* — Afsar M Qureshi
(74) *Attorney, Agent, or Firm* — Leffler Intellectual Property Law, PLLC

(57) ABSTRACT

The disclosure relates to methods, devices, and computer programs in mobile communications. More specifically, the proposed technique relates to delayed device activation. In particular the disclosure relates to enabling a communication module in a wireless node in response to receiving a sensor output. The disclosure proposes a method, performed in a first wireless node comprising a disabled communication module, for initiating communication with a second wireless node. The method comprises providing access to a sensor, receiving, from the sensor, a sensor output indicating that wireless communication is required, enabling, in response to receiving the sensor output, the communication module in the wireless node, and initiating an initial communication with the second wireless node using the enabled communication module.

26 Claims, 3 Drawing Sheets

(56) References Cited

U.S. PATENT DOCUMENTS

| | | | |
|---|---|---|---|
| 2007/0051872 A1* | 3/2007 | Goldberg | G06Q 10/087 250/208.1 |
| 2010/0033424 A1 | 2/2010 | Kabasawa et al. | |
| 2010/0302028 A1 | 12/2010 | Desai et al. | |
| 2012/0079309 A1 | 3/2012 | Gaudin et al. | |
| 2012/0208605 A1* | 8/2012 | Strauss | H04M 1/72527 455/574 |
| 2012/0320809 A1 | 12/2012 | Sturm et al. | |
| 2014/0086121 A1 | 3/2014 | Emeott et al. | |
| 2014/0125497 A1* | 5/2014 | Uchiyama | H04Q 9/00 340/870.16 |

OTHER PUBLICATIONS

PCT International Search Report, dated Jan. 25, 2017, in connection with International Application No. PCT/EP2016/062035, all pages.
PCT Written Opinion, dated Jan. 25, 2017, in connection with International Application No. PCT/EP2016/062035, all pages.

* cited by examiner

DELAYED DEVICE ACTIVATION

CROSS-REFERENCE TO RELATED APPLICATIONS

This application is a national stage application under 35 U.S.C. § 371 of PCT/EP2016/062035, filed May 27, 2016.

TECHNICAL FIELD

The disclosure relates to methods, devices, and computer programs in mobile communications. More specifically, the proposed technique relates to delayed device activation. In particular the disclosure relates to enabling a communication module in a wireless node in response to receiving a sensor output.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices or terminals also known as mobile stations and/or user equipment units, UEs, communicate via a radio access network, RAN, to one or more core networks. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

The next generation mobile communication technologies standard developed within the 3GPP is the fifth-generation, 5G, wireless networks. 5G is said to be the enabler for machine to machine, M2M, services and Internet of Things, IoT, with more capacity, lower latency and supporting low power consumption for connected devices.

In a couple of years, 50 billion devices are expected to be connected through wireless networks, hence enabling the 4$^{th}$ industrial revolution or the so called Internet of Things, IoT, era. Only the imagination limits the possibilities and applications within this field, however, some features are likely to be common for a great many of them.

The IoT has been defined in Recommendation ITU-T Y.2060 (June 2012) as a global infrastructure for the information society, enabling advanced services by interconnecting (physical and virtual) things based on existing and evolving interoperable information and communication technologies. Hence, in IoT, devices communicate with other devices. This is also referred to as Machine Type Communication, MTC, or Machine to Machine, M2M, communication. The communication may be achieved using peer-to-peer communication, i.e. Device-to-device, D2D, communication or over radio communication networks. In this type of communication people are less or never involved, instead it is the machines themselves that communicates with each other.

One 3GPP standard that is being formed to address the requirements of IoT is the so called Narrowband IoT, NB-IoT, standard which is a new narrowband radio technology standard within in the scope of the 3GPP LTE evolution. The NB-IoT technology will provide improved indoor coverage, support of massive number of low throughput devices, low delay sensitivity, ultra-low device cost, low device power consumption and optimized network architecture.

Power consumption is one parameter that is vital for the enablement and success of IoT. Ten years' longevity is a timeframe adopted by industry and which requires great resource frugality both in the communications modules as in the sensor or actuator modules of the device. Hence a great deal of work is put into defining communications protocols allowing for extended communications intervals, poor synchronization, low signal amplitudes etc. Consequently, in order for IoT to really break through, longevity is a necessity.

Hence, there is a need for a more efficient way to control the power consumption in IoT devices to prolong the battery lifetime.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

This object is achieved by a method, performed in a first wireless node comprising a disabled communication module, for initiating communication with a second wireless node, the method comprises providing access to a sensor, receiving from the sensor, a sensor output indicating that wireless communication is required, enabling, in response to receiving the sensor output, the communication module in the wireless node and initiating an initial communication with the second wireless node using the enabled communication module.

In order for IoT to really break through, longevity is a necessity. One step in this direction is to keep devices disabled until actually needed as manual enablement should be avoided for practical reasons. The proposed method provides a way of simplifying the activation process to a minimum, whereby it is possible to reduce the amount of premature and unnecessary signaling wasting sparse power resources. This is possibly a key enabler for allowing IoT into certain fields where, unless extreme power restrictions being applied, IoT would otherwise be unfeasible.

According to some aspects, the enabling is a first enablement of the communication module since the first wireless node was put into use. According to some aspects, the disabled communication module only comprises communication history recorded before the communication module was put into use or wherein the communication history is blank. By letting the communication module remain de-activated until it is really needed, unnecessary power consumption is avoided.

According to some aspects, the method comprises exchanging data associated with the sensor between the first and the second wireless nodes. The exchange of data is for example transmitting sensor data, reporting a state of the first wireless node or receiving information.

According to some aspects, the sensor is a first sensor and the method comprises providing access to a second sensor. The exchanging data then comprises exchanging data associated with the second sensor between the first and the second wireless nodes. Hence, a first sensor such as a timer might be used for activating the communication functionality in a first wireless node. Once the communication functionality is activated sensor data obtained by the second sensor might be communicated to another wireless node.

According to some aspects, the disclosure relates to a first wireless node configured to initiate communication with a second wireless node. The first wireless node comprises a disabled communication module configured to communicate with a second wireless node and processing circuitry. The processing circuitry is configured to cause the wireless node to provide access to a sensor, to receive from the sensor, a sensor output indicating that wireless communication is required, to enable, in response to receiving the sensor output, the communication module in the wireless node and to initiate an initial communication with the second wireless node using the enabled communication module.

According to some aspects, the disclosure relates to a computer program comprising computer program code which, when executed, causes a wireless node to execute the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
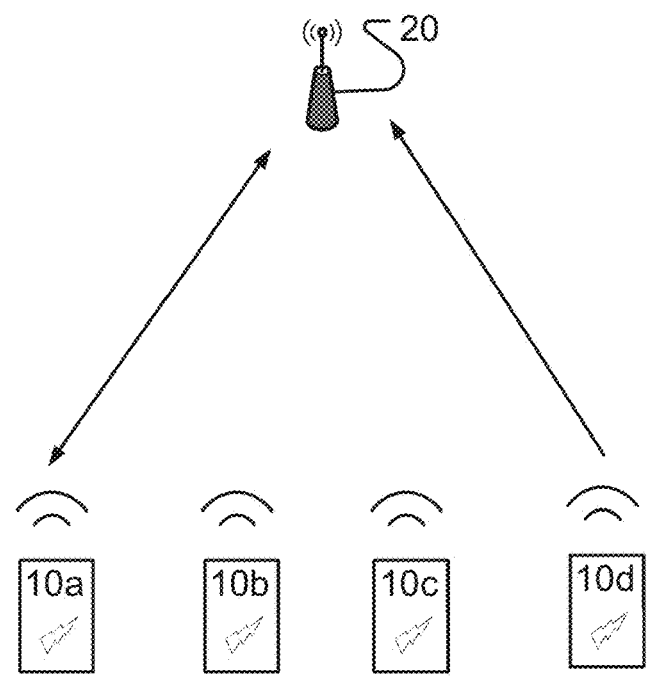
FIG. 1 shows an exemplary situation of wireless node communication according to the prior art.

Aspects of the present disclosure will be described more fully hereinafter with reference to the accompanying drawings. The apparatus and methods/disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and it is not intended to limit the invention. As used herein, the singular forms "a", "an" and "the" are intended to include the plural forms as well, unless the context clearly indicates otherwise.

As discussed above, Internet of Things, IoT, devices are expected to have ten years' longevity, which is a time period that has been adopted by the industry. This requires great resource frugality when it comes to the power consumption of the IoT devices. New radio network standards like the Narrowband IoT, NB-IoT, technology will provide protocols that support efficient power consumption for IoT devices. However, any further improvement of the power consumption of the IoT device will also prolong their lifetime and are possibly needed in order to reach the 10-year goal.

An IoT device is typically equipped with a communication module for wireless communication with a wireless node that may be another IoT device or e.g. a node in a 5G network. When the device is in communication with the node the communication module is consuming power. For IoT devices that runs on battery this means that the lifetime of the IoT device is affected when the communication module is active and/or when it attempts to communicate.

Another aspect of IoT is that some IoT devices will not be put to use immediately upon production, or rather that the communications ability is not required until a certain event is indicated from e.g. its sensors.

One example of such an application is sensors that are used for sensing items that need to be stored before further processing. One example is storing wine and whiskey in barrels etc.

Such items should be stored for one or several years, before it will be ready for further processing. Hence, a sensing device sensing, e.g. the alcohol percentage, does not really need to be activated until the time for further processing is approaching.

Another example is monitoring devices, in which a problem is known to first appear after a certain time. One example is wooden power grid poles that may be expected to last at least five years in almost any condition. However, thereafter there may be a likelihood that they start to rot. In that case continuous monitoring from the start is a waste of resources implying reduced longevity, possibly even an unviable product.

A third example is a mining rock bolt used in below ground mining for securing mine tunnels from imploding. The rock bolt may be manufactured in China and then shipped around the world to the mine location. During that time the bolt is stored in a crate inside a container on a ship at sea without any connection to the rest of the world. After two months of travel it reaches its final destination, and after yet another month it is applied in the mine tunnel where it distributes the load from the surrounding rocks, thereby preventing the tunnel from caving in. This is one application for IoT in which traditional industry is transformed using modern technology. By integrating a torque sensor and a wireless IoT modem into the bolt, together with a battery, it is possible to receive a warning, should the bolt fail, allowing for another bolt to be applied next to the failed one. However, in the example above there is also the risk that during transportation, the modem has been performing unsuccessful cell searches for two months, resulting in a depleted battery upon being applied in the mine. Assuming that this is not the case, the device may connect successfully to the server controlling the rock bolts, and also receive information from the bolt, e.g., a refined threshold value that may be depending on á priori knowledge from other rock bolts in the mine. The described technique deals with the problem of delayed device activation such that the modem of an IoT device is not initialized until there is an indication that there is a need for it (and hence device activation is not manual).

Hence, the inventors have realized that power consumption can be reduced if the communication module of an IoT device remains disabled until the IoT device indeed need to communicate with a second wireless node. If the communication module is enabled before the IoT device is put into use and indeed needs to communicate, then the communication module will only waste power from the battery of the IoT device, and even risk to drain the battery of the IoT device.

IoT devices that are personal, such as training gear, smart watches and other personal gadgets, can be switched on by a user at the time when they are supposed to activate communication with a network. Until then, the IoT devices can remain switched off and hence delay the activation of communication in order to save battery capacity or not to initiate any unnecessary communication. This situation is however not the same for all IoT machines and devices.

Activation of communication functionality in wireless nodes may today be performed in at least two different ways. One way is to enable the communication functionality manually once a wireless node is installed, which in many situations becomes unpractical or too expensive. One example is the rock bolt with an integrated sensor and a communication module. The reason why manual activation is not suitable might be that those simple IoT devices do not comprise any user interface such as buttons, and therefore manual activation is not possible. Another reason might be that if there are too many IoT devices, manually switching on every IoT device might be considered too time consuming. In a third example, the IoT sensor exact location may be unknown and hence not possible to enable without extensive search or extensive book keeping both increasing the cost of deployment.

Thus, an alternative is to enable the communication module of the wireless node in advance. Hence, today it is common that wireless nodes, such as IoT devices, have communication modules that are already enabled at manufacturing and that are connected to, or trying to connect to, another wireless node already when leaving the factory.

Both manual activation and factory activation imply that a significant amount of power may be wasted by enabling communications modules before there is an actual need for doing so.

The disclosure is based on the insight that, in order to allow for ten years' longevity, a device must not be prematurely enabled, since this may cause unnecessary operations such as sensing, cell search, etc. These operations might even occur when such operations are unnecessary or even outright futile, e.g. prior to reaching a final destination during which time a network may be unavailable. Prior art wireless nodes would in such situations, typically waste much power through unnecessary connection attempts.

Thus, the inventors have realized that there is a need for a device and method that efficiently enables an IoT device. More specifically, such that it is only enabled upon receiving an indication that it is time for such an enablement.

As already mentioned, IoT devices are equipped with different kinds of sensors. A sensor can give input to the IoT device e.g. about changes in the environment around the sensor. In one example a sensor is a temperature sensor. The sensor may have a threshold set so that the sensor only sends a signal to the IoT device when the temperature reaches a certain degree.

This disclosure proposes to use sensor data to control when the communication module of the IoT device needs to be initialized in order for the IoT device to save battery before that point in time. In particular, the communication module of the IoT device could be disabled when the IoT device is delivered and even when the IoT device is put into use. An output from a sensor can then indicate when wireless communication is required. In response to the sensor output, initial enablement of the communication module of the wireless IoT device is triggered.

Hence, the disclosure proposes a wireless node that enables its communication module upon sensing a change in the environment, which change makes it likely to assume that communication is about to be requested. Thus, the wireless node first receives an activation signal from a sensor, whereupon the device activates a communications module in order to establish a connection with a network, e.g. a cellular network.

Today, one way to control power consumption in wireless nodes during operation is letting the wireless node enter into so called sleep mode.

Sleep mode refers to a state where an electronic device, shuts down currently inactive functionality in order to save power. One example is a wireless node shutting down a communication module between transmissions and receptions. Hence, sleep mode is a phase possible to enter for a device first having been in an active mode.

What the inventors have concluded is that in order to minimize power consumption, the communication module must never be in an active mode at all until a sensor indicates that wireless communication is needed.

For better understanding of the proposed technique, sleep mode and the difference between sleep mode and the proposed methods will now be explained in more detail.

A wireless node that is connected to a network node, exchanges information about the connection properties (e.g. carrier frequency to use, Discontinuous Reception, DRX, cycles, timers, MCS formats to use, RNTI:s for decoding purposes etc.), prior to entering sleep mode. Hence, sleep mode is entered following active mode. Consequently, in order to be put in a sleep mode, a wireless node, such as an IoT device, first needs to enable the communication module and connect to the same network in order to obtain all the connection properties. By storing network information, it is possible for the wireless node to re-enter active mode using a significantly faster connection process. In order to remain in sleep mode over a prolonged period, it may be necessary for the device to periodically reenter active mode in order to update the connection properties, e.g., by updating the serving cell cell-id.

In contrary to sleep mode, the inventors instead suggest that the communication module is not enabled at all until a sensor indicates that wireless communication is needed. This means that no data related to connection properties is exchanged prior to the enablement of the communication module. Hence, the device has not been connected to the network node before in any way. The reason is e.g. that there is a long period (days, months or maybe years) of time or maybe a movement before any actual communication is needed. Hence, initiating connection might only waste energy.

Sleep mode is e.g. discussed in the patent application US2007/0051872 A1. The document discuss a camera operating in a sleep mode and that the radio will be deactivated in sleep mode.

Note that after the communication module has been enabled according to the suggested solution by the inventors, sleep mode may be a further additional way to reduce power consumption during operation of the wireless node.

FIG. 1 shows an exemplary situation of wireless node communication according to the prior art. In FIG. 1, the wireless nodes 10a-d all have enabled communication modules and consume battery. The wireless nodes are e.g. IoT devices. In the example, the wireless node 10a has established a two-way communication with the wireless node 20. The wireless nodes 10b and 10c search for other wireless nodes. During search or establishment of a connection the wireless node often consumes more power than in normal operation due to that higher power output may be used together with a more frequent communication activity, depending on the communication protocol. In FIG. 1 the wireless node 10d is broadcasting information in a one way communication with the wireless node 20. All the wireless nodes 10a-d in FIG. 1 consume power and do so even if the wireless nodes do not have any data of relevance to communicate over the wireless network. In one example a wireless node may have a sensor that only has data to communicate when the output data from the sensor is above a certain threshold. Independent of whether the output data is over the threshold or not, the wireless node is activated with an enabled communication module.

Figure 2:
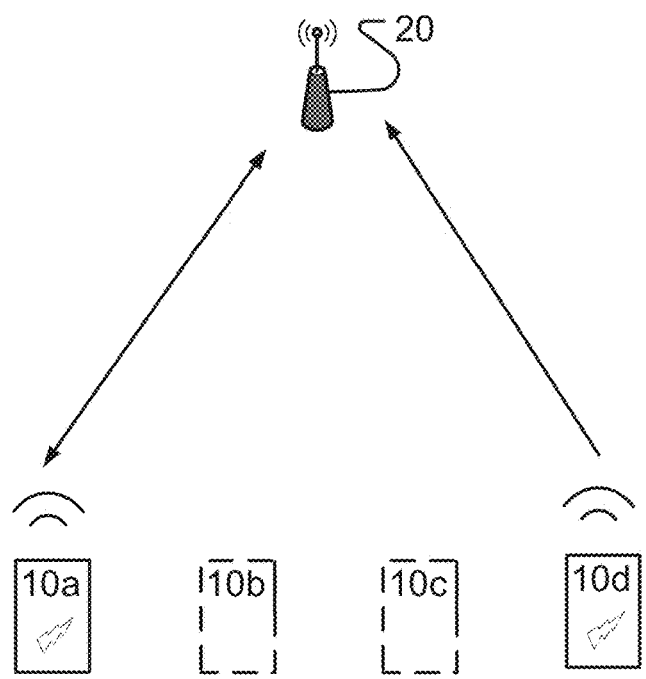
FIG. 2 is shows an example situation in the system of FIG. 1, wherein the wireless nodes are operating according to the proposed technique.

FIG. 2 shows an example situation in the system of FIG. 1, wherein the wireless nodes 10a-d are operating according to the proposed technique. In FIG. 2 some of the wireless nodes 10a-d have enabled communication modules and some of the wireless nodes have communication modules that have not yet been enabled. In FIG. 2 the communication modules of the wireless nodes 10b and 10c are not enabled. In this state the wireless nodes 10b and 10c consume none or less power compared to if the communication modules were enabled. The wireless nodes 10b and 10c are e.g. IoT devices equipped with sensors. The reason why the communication modules of the wireless nodes 10b and 10c are not enabled may be that wireless communication is not yet required. The effect with this operation compared to the operation of the wireless nodes 10b and 10c in the prior art is that the wireless nodes 10b and 10c in FIG. 2 have a more efficient power consumption that will make the batteries last longer.

In FIG. 2 the wireless node 10a, e.g. an IoT device, has initiated an initial communication with the second wireless node 20 using an enabled communication module. The communication module of the wireless node 10a has been enabled for the first time for example due to that a sensor has sensed a change in the environment that is above a certain threshold and thereby indicated to the IoT device that wireless communication is required.

For example the IoT device 10a comprises a humidity sensor that is installed in a boat. The sensor in the boat becomes drowned into water due to that the boat is slowly sinking. The IoT device 10a is then in a state where it is required to communicate data to a second wireless node 20 so that e.g. the owner of the boat gets a notification. Hence, a humidity sensor sends a sensor input which triggers enablement of the communication module. Since the communication module of the IoT device has not been enabled before, there is a greater likelihood that there is more battery left that now can be used when the communication module is enabled to initiate communication with the second wireless node 20.

The wireless node 10d in FIG. 2 also has an enabled communication module that is broadcasting data to the wireless node 20. For example the wireless node 10d is a small IoT device on a key chain with a movement sensor. The IoT device 10d has detected that is has not been moving for days and considers itself to be dropped accidently by its owner. The IoT device then receives a sensor output indicating that wireless communication is required. Hence, the communication module 10d of the IoT device is enabled. The IoT device broadcasts a signal that is picked up by a second wireless node 20.

Figure 3:
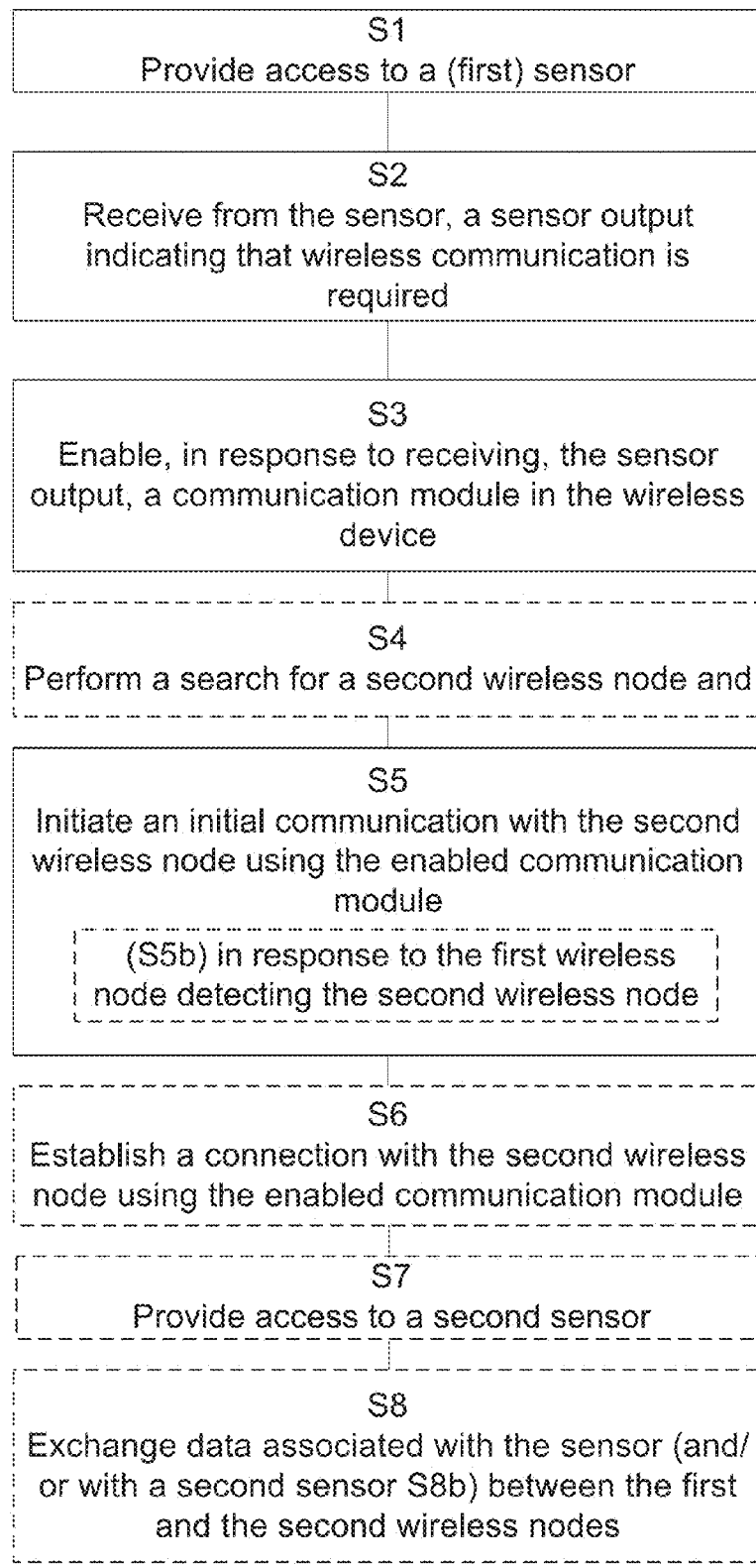
FIG. 3 is a flowchart illustrating method steps performed in a wireless node according to the proposed technique.

The proposed methods will now be described in more detail referring to FIGS. 3 and 4. It should be appreciated that FIGS. 3 and 4 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which is e.g. comprised in, or a part of, or are further embodiments, which may be taken in addition to the operations and modules of the broader example embodiments. It should be appreciated that the operations do not need to be performed in order. Furthermore, it should be appreciated that not all of the operations need to be performed. The example operations may be performed in any order and in any combination.

Example Node Operations

A proposed method, performed in a first wireless node comprising a disabled communication module, for initiating communication with a second wireless node will now be described referring to FIG. 3. The first wireless node 10 is e.g. any of the wireless nodes 10a-10d in FIG. 2. The second wireless node is e.g. the second wireless node of FIG. 2.

Hence, the first wireless node 10 has disabled communication module. A disabled communication module is a communication module that has not been previously active in the present context or after production. Tests during production are not considered previous activity. Hence, a disabled communication module comprises in contrast to a sleeping communication module no stored data from previous communications. In other words, the disabled communication module only comprises communication history recorded before the communication module was put into use or wherein the communication history is blank. Put into use, refers e.g. to when the communication module left the production facility or retailer. The disabled communication device may however comprise pre-stored communication information stored on a SIM card such as Public Land Mobile Network, PLMN, carrier frequencies etc., which is not history information from previous communication.

The method comprises providing S1 access to a sensor. The sensor could be placed within or outside the wireless node. Providing access to a sensor implies that the wireless node can read or receive sensor data from the sensor. The sensor is for example a torque sensor, a temperature sensor, a time sensor, a radio receiver, a conductor/voltage/current sensor, a magnetic sensor, a location sensor, or a pressure sensor. Other examples of sensors are a sensor of location (e.g. GNSS), humidity, electromagnetic fields or charges, magnetism, smoke, water, length, alcohol etc.

The method further comprises receiving S2 from the sensor, a sensor output indicating that wireless communication is required. In other words, the wireless node reads a sensor response from the sensor, which informs the wireless node 10 that it is time to activate the communication functionality or capability of the wireless node 10. Typically, the indication is a sensor value being below or above a threshold. Stated differently, the sensor output is indicating that wireless communication is required, if the sensor output is above or below a predefined value.

In one example the sensor is a time sensor, e.g. a timer. The sensor output is then e.g. a sensor response indicating that a time has expired. The time is e.g. a predefined time pre-programmed e.g. at manufacturing or at a retailer.

In another example the sensor is a radio receiver, e.g. a Near Field Communication, NFC, receiver. The radio receiver that indicates that wireless communication is required might e.g. be a wakeup receiver that is activated by energy. By sending out energy the wakeup receiver might be activated, wherein a sensor output indicating that wireless communication is required is generated. This sensor output is an indication that wireless communication is required.

In other words, the proposed method is a method for enabling a communications module of a wireless node such as an IoT device, by receiving an activation signal from at least one sensor. Upon receiving the activation signal, the device activates or enables the communication functionality i.e. the modem, which then tries to connect to a second wireless node or server, either directly or indirectly through a base station, access point, AP, or a mesh device i.e. via Device-to-Device, D2D, communication, etc. Hence, the method further comprises, enabling S3, in response to receiving S2 the sensor output, the communication module in the wireless node. In other words, the wireless node "turns on", powers on or enables the wireless communication module when detecting a certain sensor output.

The method further comprises, initiating S5 an initial communication with the second wireless node using the enabled communication module. As discussed above, the enabling is an initial enabling of the wireless communication module. That is, the communication module has been inactive up to this point in time and this is the first time it is enabled for the present use. For example, it is a first activation after manufacturing, installation or retail. This is different from sleep mode, which is discussed above, which is resuming a previous communication. In other words, according to some aspects, the enabling S3 is a first enablement of the communication module since the first wireless node was put into use. Typically, the first time the first wireless node was put into use within the present network.

The initial communication might be uplink, downlink or both directions. Hence initiating communication e.g. comprises transmitting data and/or receiving data. The wireless node e.g. sends or received data from another wireless node, which is sometimes pre-configured. The wireless node alternatively sends data to or received data from many wireless nodes.

According to some aspects, the wireless node broadcasts data, such as sensor data, without identifying any specific receiver. Such a transmission might occur without any preceding reception.

Alternatively, the method comprises establishing S6 a connection with the second wireless node using the enabled communication module. Then the initiation involves exchanging data in order to set up a communication link. Hence, initiating communication might involve establishing communication with one or several other wireless nodes.

According to some aspects, the wireless node 10 performs S4 a search for a second wireless node. In other words, the wireless node 10 performs scanning for determining a second wireless node. Performing S4 the search comprises e.g. scanning one or more frequency bands, performing a cell search, performing neighbor discovery, performing peering, or establishing a predefined server connection. After performing S4 the search the initiating S5, described above, is performed. Hence, according to these aspects, the initiating S5b is performed in response to the first wireless node detecting the second wireless node.

Upon detection of a second wireless node, the first wireless node 10 typically performs at least one action associated to the sensor response and/or the second wireless node 20. According to some aspects, the method comprises exchanging data S8 associated with the sensor between the first and the second wireless nodes. The exchange of data S8 is for example transmitting sensor data, reporting a state of the first wireless node or receiving information. For example, upon connecting to the second wireless node, the IoT device reports information e.g. its state according to a predefined protocol i.e. assumes its normal operation. According to some aspects, the communication also includes that the enabled wireless node 10 receives information from a serving access point or cell or connected mesh device. For example the IoT device receives a request to confirm a correct type of connection.

According to some aspects, the sensor is a first sensor and the method comprises providing S7 access to a second sensor. The exchanging data S8 then comprises exchanging data S8b associated with the second sensor between the first and the second wireless nodes. Hence the first sensor might have the sole purpose of waking up the wireless node 10. Once woken up the sensor output of the second wireless node is the data that is transmitted to e.g. a server. One example is the wine cellar. An alcohol meter or timer might then be sensors suitable for waking up the first wireless node 10. However, once the communication is established, other sensors like temperature, light or moist sensors are more relevant. Hence, those sensor values are transmitted using the enabled communication module.

According to some aspects, once a connection to a device or cellular network (e.g. an access point) is detected, certain verification steps are performed and information between the device and the connected remote node is made. For example, upon connecting to the second wireless node, the IoT device reports its state according to a predefined protocol, i.e., assumes its normal operation. In other embodiments, the communication may also include that the enabled device receives information from the serving Access Point, AP, or cell or connected mesh device to confirm a correct type of connection.

According to some aspects, once a connection to a device or cellular network (or AP) is detected, certain verification steps are performed and information between the device and the connected remote node is made.

The verification step in some embodiments requires some verification information. One example is where the sensor indicates some kind of mechanical pairing e.g. a torque sensor in case say a connected bolt is paired with a connected screw-nut. The verification might imply verifying that the bolt and nut are mechanical compatible with each other (dimension or thread wise, sensitivity to corrosion or maybe torque information).

According to some aspects, the verification step is used in order to identify a certain type of object related to the second wireless node in order to adopt a certain mode of operation based on the type of the second wireless node. For example, the device may be tested at the factory after which its modem is again deactivated until it is being used for real.

Example Node Configurations

Figure 4:
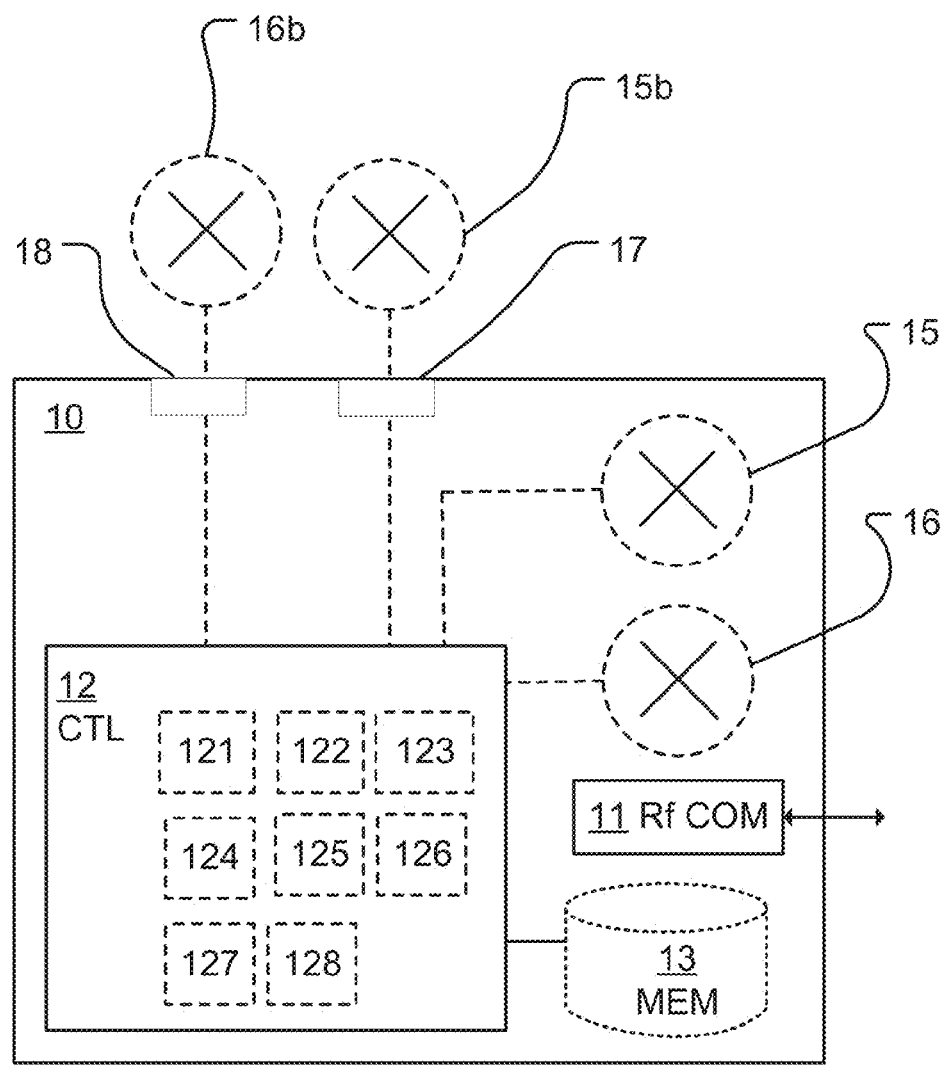
FIG. 4 is an example of a second wireless node, according to some aspects of the proposed technique.

FIG. 4 illustrates an example of a first wireless node 10, which incorporates some of the example embodiments discussed above. FIG. 4 discloses a first wireless node 10 configured to initiate communication with a second wireless node. The second wireless node is e.g. a radio access point of a communication network.

A "wireless node" as the term may be used herein, is to be broadly interpreted to include an end terminal (user) that attaches to the wireless communication network, and may refer to either an IoT device or MTC device (e.g., smart meter) or a non-IoT/MTC device. Thus, the term may be synonymous with the term mobile device, mobile station, MS, "User Equipment" or UE, as that term is used by the 3rd-Generation Partnership Project, 3GPP, and includes standalone wireless devices, such as terminals, cell phones, tablets, smart phones, and wireless-equipped personal digital assistants, as well as personal computers, electrical meters, etc. In its simplest form the wireless node is a device equipped with a communication module.

As shown in FIG. 4, the wireless node 10 comprises a communication module. The communication module might also be referred to as a wireless modem, radio communication interface, communication module, or radio circuitry 11. The communication module is configured to receive and transmit any form of communications or control signals within a network. The communication module typically comprises hardware and software required to establish a wireless connection with another communication module. Functionality of the communication module 11 is e.g. antenna, radio frequency circuitry, baseband processing circuitry and software for controlling the reception and transmission. One example of a communication module is a 5G modem.

It should be appreciated that the radio circuitry 11 is according to some aspects comprised as any number of transceiving, receiving, and/or transmitting units or circuitry. It should further be appreciated that the radio circuitry 11 is e.g. be in the form of any input/output communications port known in the art.

Before performing the proposed method, the communication module 11 is disabled. Disabled herein refers to a state wherein the communication module 11 has not been active, at least not after being put into use. By performing the proposed method the communication module will be enabled, as discussed above.

The first wireless node 10 according to some aspects further comprises at least one memory unit or circuitry 13 that is in communication with the radio circuitry 11. The processing circuitry 13 is e.g. configured to store sensor data, received or transmitted data and/or executable program instructions. The memory 13 is e.g. any suitable type of computer readable memory and is e.g. of volatile and/or non-volatile type.

According to some aspects the wireless node 10 comprises a sensor 15, such as a sensor 15 configured to provide a sensor output indicating that wireless communication is required, as described above. This sensor 15 is now referred to as the first sensor 15.

According to some aspects the wireless node 10 comprises a second sensor 16. The second sensor 16 is a sensor for sensing data that should be provided to e.g. a server using the communication module 11. Hence, in the example with the rock bolts above the first sensor is e.g. a timer and the second sensor is e.g. a torque sensor.

As discussed above the first and second sensors are in some embodiments not comprised within the wireless node. In such situations the wireless node 10 comprises interfaces 17, 18 for communication with a first external sensor 15b and a second external sensor 16b respectively. The interfaces are wireless or wired. Example implementations of the interfaces 17, 18 are cable, fibre or wireless protocols like NFC, Bluetooth or Zigbee.

The first sensor 15, 15b and/or the second sensor 16, 16b is e.g. a torque sensor, a temperature sensor, a timer, a radio receiver, a conductor/voltage/current sensor, a magnetic sensor and a pressure sensor.

The wireless node 10 further comprises processing circuitry 12, which is configured to cause the first wireless node to provide access to a sensor 15, to receive from the sensor 15, a sensor output indicating that wireless communication is required. The processing circuitry 12 is further configured to cause the wireless node 10 to enable, in response to receiving the sensor output, the communication module 11 in the first wireless node 10 and to initiate an initial communication with a second wireless node using the enabled communication module 11. According to some aspects, the disabled communication module 11 only comprises communication history recorded before the communication module was put into use or wherein the communication history is blank.

The processing circuitry 12 is e.g. any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but is according to some aspects provided as any number of units or circuitry.

The controller, CTL, or processing circuitry 12 is e.g. constituted by any suitable type of computation unit, e.g. a microprocessor, Central Processing Unit, CPU, microcontroller, Digital Signal Processor, DSP, Field Programmable Gate Array, FPGA, or Application Specific Integrated Circuit, ASIC, or any other form of circuitry capable of executing computer program code. The computer program is e.g. stored in a memory, MEM, 13. The memory 13 can be any combination of a Read And write Memory, RAM, and a Read Only Memory, ROM. The memory 13 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry. According to some aspects, the disclosure relates to a computer program comprising computer program code which, when executed, causes a first wireless node to execute the methods described above and below.

According to some aspects, the processing circuitry 12 is configured to cause the first wireless node to enable the communication module for the first time since the first wireless node was put into use.

According to some aspects, the processing circuitry 12 is configured to cause the first wireless node to perform a search for a second wireless node, and then the processing circuitry 12 is configured to initiate the initial communication in response to the first wireless node detecting the second wireless node.

According to some aspects, the processing circuitry 12 is configured to cause the first wireless node to establish a connection with the second wireless node using the enabled communication module.

According to some aspects, the processing circuitry 12 is configured to cause the first wireless node to exchange data associated with the sensor between the first and the second wireless nodes.

According to some aspects, the processing circuitry 12 is configured to exchange data S7 by performing at least one of; transmitting sensor data, reporting a state of the first wireless node and receiving information.

According to some aspects, a sensor output is indicating that wireless communication is required if the sensor output is above or below a predefined value.

According to some aspects the processing circuitry 12 is configured to perform the search by scanning one or more frequency bands, performing a cell search, performing neighbor discovery, performing peering, or establishing a predefined server connection.

According to some aspects the first wireless node 10 or the processing circuitry 12 comprises modules configured to perform the methods described above. The modules are implemented in hardware or in software or in a combination thereof. The modules are according to one aspect implemented as a computer program stored in a memory 13 which run on the processing circuitry 12.

According to some aspects the wireless node 10 or the processing circuitry 12 comprises a provider 121 configured to provide access to a sensor.

According to some aspects the wireless node 10 or the processing circuitry 120 comprises a receiver module 122 configured to receive from the sensor, a sensor output indicating that wireless communication is required.

According to some aspects the wireless node 10 or the processing circuitry 120 comprises an enabler 123 configured to enable, in response to receiving the sensor output, the communication module in the first wireless node.

According to some aspects the wireless node 10 or the processing circuitry 120 comprises a performer 124 configured to perform a search for a second wireless node.

According to some aspects the wireless node 10 or the processing circuitry 120 comprises an initiator 125 configured to initiate an initial communication with the second wireless node using the enabled communication module.

According to some aspects the wireless node 10 or the processing circuitry 120 comprises a connection establisher 126 configured to establish a connection with the second wireless node using the enabled communication module.

According to some aspects the wireless node 10 or the processing circuitry 120 comprises a sensor provider 127 configured to providing access to a second sensor.

According to some aspects the wireless node 10 or the processing circuitry 120 comprises a data exchange module 128 configured to exchanging data S8 associated with the sensor between the first and the second wireless nodes.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which in one aspect are implemented by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, performed in a first wireless node comprising a communication module that is disabled, for initiating communication with a second wireless node, the method comprising:
   providing access to a sensor;
   receiving from the sensor, a sensor output indicating that wireless communication is required;
   enabling, in response to receiving the sensor output, the communication module in the wireless node;
   using the enabled communication module to perform a search for the second wireless node without assistance from information derived from a previous use of the communication module in the wireless node; and in response to the first wireless node detecting the second wireless node, initiating an initial communication with the second wireless node using the enabled communication module.

2. The method according to claim 1, wherein the enabling is a first enablement of the communication module since the first wireless node was put into use.

3. The method according to claim 1, wherein the disabled communication module does not comprise communication history recorded after the communication module was put into use.

4. The method according to claim 1, further comprising: establishing a connection with the second wireless node using the enabled communication module.

5. The method according to claim 1, comprising: exchanging data associated with the sensor between the first and the second wireless nodes.

6. The method according to claim 5, wherein exchanging data comprises at least one of:
transmitting sensor data;
reporting a state of the first wireless node; and
receiving information.

7. The method according to claim 1, wherein the sensor is a first sensor and wherein the method comprises:
providing access to a second sensor;
exchanging data associated with the second sensor between the first and the second wireless nodes.

8. The method according to claim 1, wherein sensor output is indicating that wireless communication is required if the sensor output is above or below a predefined value.

9. The method according to claim 1, wherein the performing of the search comprises scanning one or more frequency bands, performing a cell search, performing neighbor discovery, performing peering, or establishing a predefined server connection.

10. The method according to claim 1, wherein the second wireless node is a radio access point of a communication network.

11. The method according to claim 1, wherein the first wireless node is a sensor device.

12. The method according to claim 1, wherein the sensor is at least one of:
a torque sensor,
a temperature sensor,
a timer,
a radio receiver,
a conductor/voltage/current sensor,
a magnetic sensor, and
a pressure sensor.

13. A first wireless node configured to initiate communication with a second wireless node comprising:
a communication module configured to communicate with a second wireless node, wherein the communication module is disabled; and
processing circuitry configured to cause the wireless node:
to provide access to a sensor;
to receive from the sensor, a sensor output indicating that wireless communication is required;
to enable, in response to receiving the sensor output, the communication module in the wireless node;
to use the enabled communication module to perform a search for the second wireless node without assistance from information derived from a previous use of the communication module in the wireless node; and
to initiate, in response to the first wireless node detecting the second wireless node, an initial communication with the second wireless node using the enabled communication module.

14. The first wireless node of claim 13, wherein the processing circuitry is configured to enable the communication module for the first time since the first wireless node was put into use.

15. The first wireless node of claim 13, wherein the disabled communication module does not comprise communication history recorded after the communication module was put into use.

16. The first wireless node of claim 13, wherein the processing circuitry is configured:
to establish a connection with the second wireless node using the enabled communication module.

17. The first wireless node of claim 13, wherein the processing circuitry is configured to:
to exchange data associated with the sensor between the first and the second wireless nodes.

18. The first wireless node of claim 17, wherein the processing circuitry is configured to exchange data by performing at least one of:
transmitting sensor data;
reporting a state of the first wireless node; and
receiving information.

19. The first wireless node of claim 13, wherein the processing circuitry is configured to:
providing access to a second sensor; and
to exchange data associated with the second sensor between the first and the second wireless nodes.

20. The first wireless node of claim 13, wherein a sensor output is indicating that wireless communication is required if the sensor output is above or below a predefined value.

21. The first wireless node of claim 13, wherein the processing circuitry is configured to perform the search by scanning one or more frequency bands, performing a cell search, performing neighbor discovery, performing peering, or establishing a predefined server connection.

22. The first wireless node of claim 13, wherein the first wireless node is configured to initiate communication with a second wireless node being a radio access point of a communication network.

23. The first wireless node of claim 13, wherein the first wireless node is a sensor device.

24. The first wireless node of claim 13, wherein the sensor comprises at least one of:
a torque sensor,
a temperature sensor,
a timer,
a radio receiver,
a conductor/voltage/current sensor,
a magnetic sensor, and
a pressure sensor.

25. The first wireless node of claim 13, wherein the sensor is comprised in the first wireless node.

26. A nontransitory computer readable storage medium comprising computer program code which, when executed by a processor of a wireless node comprising a communication module that is disabled, causes the wireless node to execute a method for initiating communication with a second wireless node, the method comprising:
providing access to a sensor;
receiving from the sensor, a sensor output indicating that wireless communication is required;
enabling, in response to receiving the sensor output, the communication module in the wireless node;

using the enabled communication module to perform a search for the second wireless node without assistance from information derived from a previous use of the communication module in the wireless node; and in response to the first wireless node detecting the second wireless node, initiating an initial communication with the second wireless node using the enabled communication module.

\* \* \* \* \*